United States Patent
Kelly

(10) Patent No.: US 7,500,182 B2
(45) Date of Patent: *Mar. 3, 2009

(54) HOST WEB PAGE DISPLAYING TARGET WEB PAGE IMAGE

(75) Inventor: Nima Kelly, Scottsdale, AZ (US)

(73) Assignee: Go Daddy Group, Inc., Scottsdale, AZ (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/020,811

(22) Filed: Dec. 22, 2004

(65) Prior Publication Data

US 2006/0168127 A1 Jul. 27, 2006

(51) Int. Cl.
G06F 17/00 (2006.01)

(52) U.S. Cl. .................. 715/234; 715/762; 715/810

(58) Field of Classification Search ............. 715/762, 715/810, 513, 234
See application file for complete search history.

(56) References Cited

U.S. PATENT DOCUMENTS

| | | | |
|---|---|---|---|
| 5,781,730 A | 7/1998 | Reimer et al. | 709/203 |
| 5,844,542 A | 12/1998 | Inoue et al. | 345/594 |
| 5,859,637 A | 1/1999 | Tidwell, II | 715/708 |
| 5,874,988 A | 2/1999 | Gu | 348/97 |
| 5,933,549 A | 8/1999 | Ide et al. | 382/309 |
| 5,990,901 A | 11/1999 | Lawton et al. | 345/581 |
| 6,031,543 A | 2/2000 | Miyashita et al. | 345/593 |
| 6,046,741 A | 4/2000 | Hochmuth | 715/704 |
| 6,178,272 B1 | 1/2001 | Segman | 382/298 |
| 6,243,070 B1 | 6/2001 | Hill et al. | 345/589 |
| 6,252,577 B1 | 6/2001 | Rashkovskiy et al. | 345/670 |
| 6,272,261 B1 | 8/2001 | Matsuoka | 382/276 |
| 6,278,434 B1 | 8/2001 | Hill et al. | 345/660 |
| 6,285,784 B1 | 9/2001 | Spaulding et al. | 382/162 |
| 6,313,835 B1 * | 11/2001 | Gever et al. | 715/846 |
| 6,330,068 B1 | 12/2001 | Matsuyama | 358/1.14 |
| 6,333,752 B1 | 12/2001 | Hasegawa et al. | 715/764 |
| 6,337,692 B1 | 1/2002 | Rai et al. | 345/594 |
| 6,369,787 B1 | 4/2002 | Wu et al. | 345/87 |
| 6,396,505 B1 | 5/2002 | Lui et al. | 345/613 |
| 6,571,051 B2 | 5/2003 | Savoie | 386/55 |

(Continued)

OTHER PUBLICATIONS

Graham, Paul, "The Other Road Ahead" Sep. 2001 http://www.paulgraham.com/road.html.*

(Continued)

Primary Examiner—Stephen S Hong
Assistant Examiner—Adam M Queler
(74) Attorney, Agent, or Firm—Stewart J. Womack

(57) ABSTRACT

A system and method are disclosed for allowing a target web page to be edited on a host web page by a Designer. A scaled view of the target web page may be displayed on the host web page so that the Designer may view the target web page during the editing process. An editing palette may be selected, from a menu of editing palettes, for editing the target web page. An overlay, corresponding to the selected editing palette, may be positioned next to or superimposed over the scaled view of the target web page. The overlay may provide positioning or other types of information to assist the Designer in using the selected editing palette. Different overlays may be used as different editing palettes are selected. Once the target web page is customized, it can be made accessible via the Internet.

14 Claims, 5 Drawing Sheets

U.S. PATENT DOCUMENTS

| | | |
|---|---|---|
| 6,590,584 B1 | 7/2003 | Yamaura et al. ............ 715/704 |
| 6,888,552 B2 | 5/2005 | Debevec et al. ............ 345/589 |
| 6,891,550 B1 | 5/2005 | Nolan ........................ 345/619 |
| 6,914,612 B2 | 7/2005 | Hino et al. ................. 345/582 |
| 6,927,777 B2 | 8/2005 | Kitsutaka ................... 345/582 |
| 6,938,205 B1 * | 8/2005 | Hanson et al. .............. 715/526 |
| 6,957,008 B1 | 10/2005 | Yasui ......................... 386/55 |
| 6,977,662 B2 | 12/2005 | Sharman .................... 345/589 |
| 7,000,184 B2 * | 2/2006 | Matveyenko et al. ....... 715/530 |
| 7,062,492 B1 * | 6/2006 | Graham ...................... 707/10 |
| 2005/0246627 A1 * | 11/2005 | Sayed ........................ 715/513 |

OTHER PUBLICATIONS

Mickiewicz, Matt and Nicky Danino, "GIF, JPG and PNG—What's the difference?" Dec. 26, 1999 http://www.sitepoint.com/print/gif-jpg-png-whats-difference.*

Microsoft Computer Dictionary, © 2002 Microsoft Corporation, 5th Edition, p. 383.*

* cited by examiner

HOST WEB PAGE DISPLAYING TARGET WEB PAGE IMAGE

CROSS REFERENCE TO RELATED PATENT APPLICATIONS

This patent application is related to the following patent application concurrently filed herewith, also assigned to The Go Daddy Group, Inc.:

U.S. patent application Ser. No. 11/022,487, "TARGET WEB PAGE EDITED USING OVERLAY ON HOST WEB PAGE"

FIELD OF THE INVENTION

The present invention relates to systems and methods for providing a graphical interface that may be used for editing a target web page which is displayed in a scaled mode on a host web page.

BACKGROUND OF THE INVENTION

The Internet is a worldwide network of computers and computer networks arranged to allow the easy and robust exchange of information between the users of the computers. Hundreds of millions of people around the world have access to computers connected to the Internet via one of the hundreds of Internet Service Providers (ISPs). Content providers place multimedia information, i.e. graphics and sounds, and other forms of data at specific locations on the Internet referred to as web sites that are typically hosted by website hosting providers. Each web site may include one or more interconnected web pages. Web sites typically have a structure or design whereby a User may easily move back and forth, using menus or links, among the web pages in the web site. The combination of all the web sites and their corresponding web pages on the Internet is generally known as the World Wide Web (web or WWW).

Web pages may be created using HyperText Markup Language (HTML) to generate a standard set of tags that define how the web pages associated with a web site will be displayed. Users of the Internet may access content providers' web sites using a software program known as a browser. After the browser has located a desired web page, it requests and receives information from the web page, typically in the form of an HTML document, and then displays the web page's content for the user. The user may thereafter view other web pages at the same web site or may move to an entirely different web site using the browser.

Browsers are able to locate different web sites because web sites on the Internet generally have a unique Internet Protocol (IP) address associated with them. IP addresses are 32 bit binary numbers, but are typically shown in dotted decimal notion, e.g. 192.145.68.112, to improve human readability. However, IP addresses, even in dotted decimal notation, are difficult to remember and use by people. Domain names are much easier to remember and may be associated with an IP address.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g. .com, .net, .org, .us, .biz, etc.). The Internet Corporation for Assigned Names & Numbers (ICANN) approves all TLDs and delegates the responsibility to a particular organization (hereinafter Registry) for maintaining an authoritative source for the registered domain names within a TLD and their corresponding IP addresses. There is one organization, or Registry, for each of the ICANN approved TLDs. For certain TLDs, e.g. .biz, .info, .us, the Registry is also the authoritative source for contact information related to the domain name. For other TLDs, e.g. .com, .ws, .net, a Registrar is the authoritative source for the contact information related to the domain name. The Shared Registration System (SRS) is a central system for all accredited registrars to access, register and control domain names.

The process for registering a domain name with a particular Registry allows a Customer to use an ICANN-accredited Registrar. For example if John Doe wishes to register the domain name "JohnDoe.com", John Doe may initially verify whether the desired domain name is or is not available by contacting a Registrar. The Customer may make this contact using the Registrar web site and typing the desired domain name into a field in the Registrar web site created for this purpose. Upon receiving the request from the Customer, the Registrar may ascertain whether "JohnDoe.com" has already been registered by checking the WHOIS database of the Registry associated with the TLD of the domain name or with the open SRS WHOIS database of the Registrar. The results of the search may then be displayed on the web site to thereby notify the Customer of the availability of the domain name. If the domain name is available, the Customer may proceed with the registration process. Otherwise, the Customer may have to keep selecting alternative domain names until an available domain name is found.

In an effort to increase the number of domain names they register, Registrars may enable Resellers to offer domain name registration services to the Resellers' Customers. In this system, Resellers may coordinate their efforts with a Registrar in registering domain names to the Resellers' Customers by allowing the Reseller's Customers to hyperlink to a web page or web site designed or customized by the Reseller, but operated by the Registrar. This approach has the advantage of allowing each Reseller to be able to customize the Registrar's web page or web site so that each Reseller may continue to use its brands, trademarks, color schemes, etc. to retain and build the Reseller's Customers' loyalty and confidence in the Reseller.

BRIEF DESCRIPTION OF THE DRAWINGS

FIG. 3 is an illustration of a host web page showing several possible target web pages to start with;

DETAILED DESCRIPTION OF THE PREFERRED EMBODIMENTS

Figure 1:
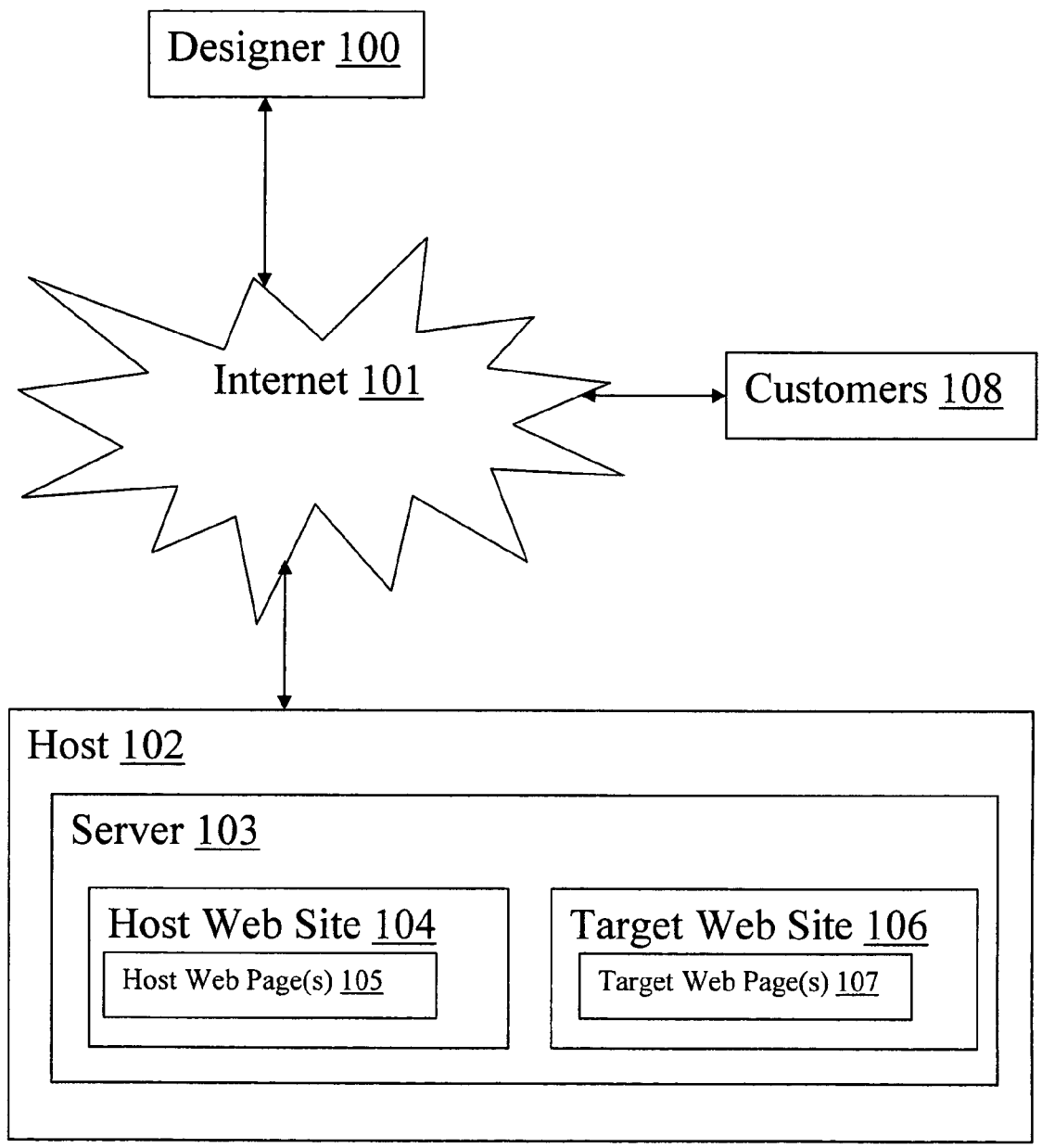
FIG. 1 is a block diagram illustrating a possible communication path for an embodiment of the invention.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

As shown in FIG. 1, the Internet 101 provides a communication path for a web site designer (hereafter Designer 100) to communicate with a host web site 104 (and its corresponding host web pages 105) via a server 103 operated by a Host 102. Of course, other types of communication systems may also be used to permit the Designer 100, Host 102 and Customers 108 to communicate with each other. The illustrated configuration permits the Designer 100 to edit a target web site 106 and its associated target web pages 107 via the Internet. The illustrated configuration is very general and may perform a variety of functions and operations in many different environments. However, the embodiments discussed in greater detail below are particularly advantageous for particular marketing systems know as reseller programs. Reseller programs typically permit a Reseller (referred to as the Designer 100 above) to market and sell, from the target web site 106, products that may be manufactured, produced, serviced, etc. by the Host 102. Reseller programs allow the Host 102 to benefit from the marketing efforts of the Reseller and also allow the Reseller to benefit from the Host 102 providing the product and/or services being marketed by the Designer 100.

As a specific example of such an embodiment, the Designer 100 may be a Reseller of domain names, the target web site 106 may be a web site designed/edited by the Reseller and used by the Reseller for marketing and selling domain names and the Host 102 may be a Registrar of domain names. This embodiment permits a Registrar of domain names to enlist the services of Resellers to market and sell domain names. In addition, this embodiment assists the Resellers in designing and creating a target web site 106 (typically with logos, brands, etc. of the Reseller) that will be operated and maintained by the Registrar. In practice, the Designer/Reseller 100 may receive compensation for every Customer 108 that visits the target web site 106 and/or for every purchase made by the Customers 108 from the Host/Registrar 102. The Registrar may enlist the services of a plurality of Resellers to increase the number of Customers that visit the target web site 106.

Figure 4:
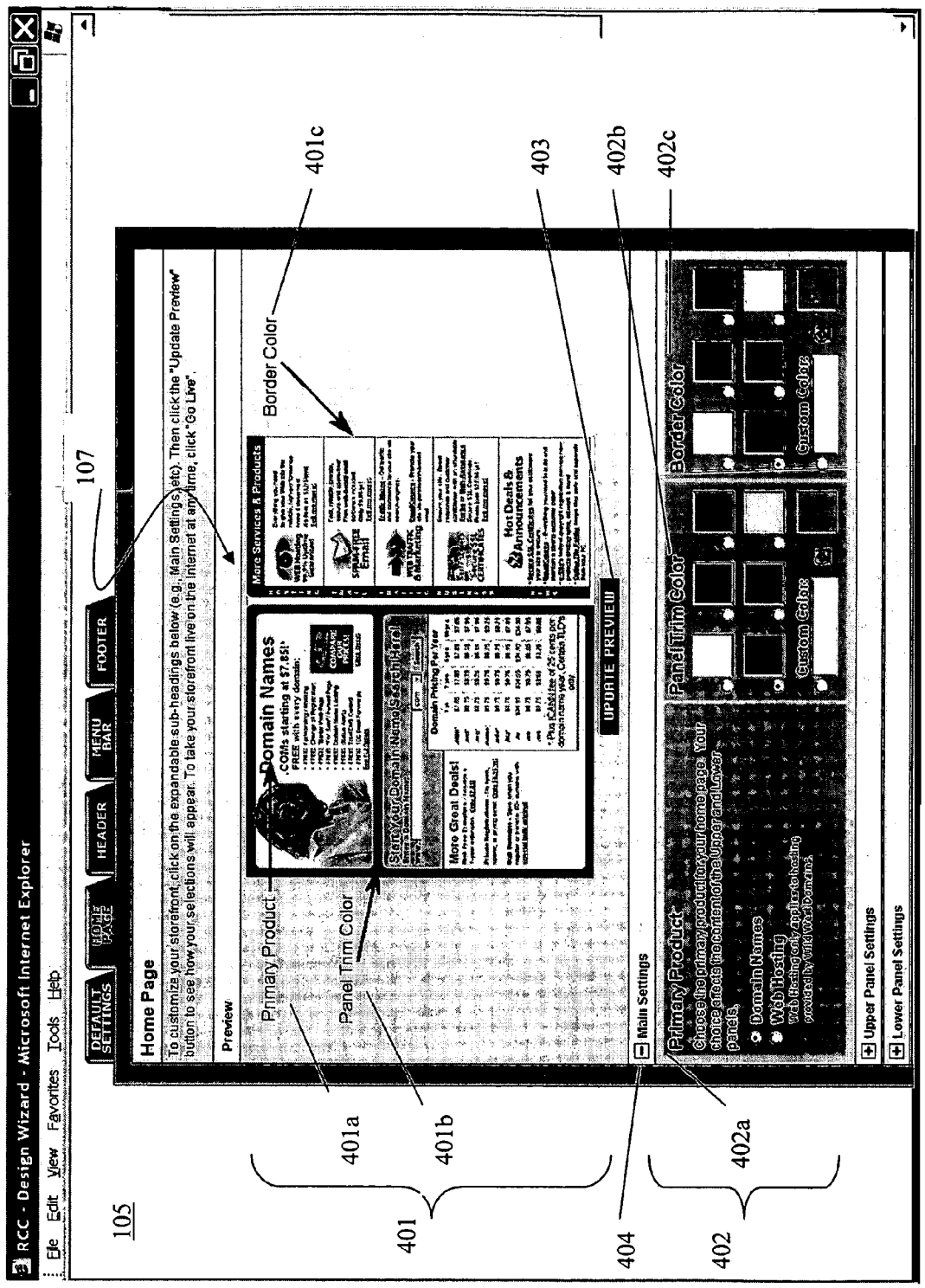
FIG. 4 is an illustration of a host web page showing a scaled view of a target web page, a first overlay and a first editing palette.
Figure 5:
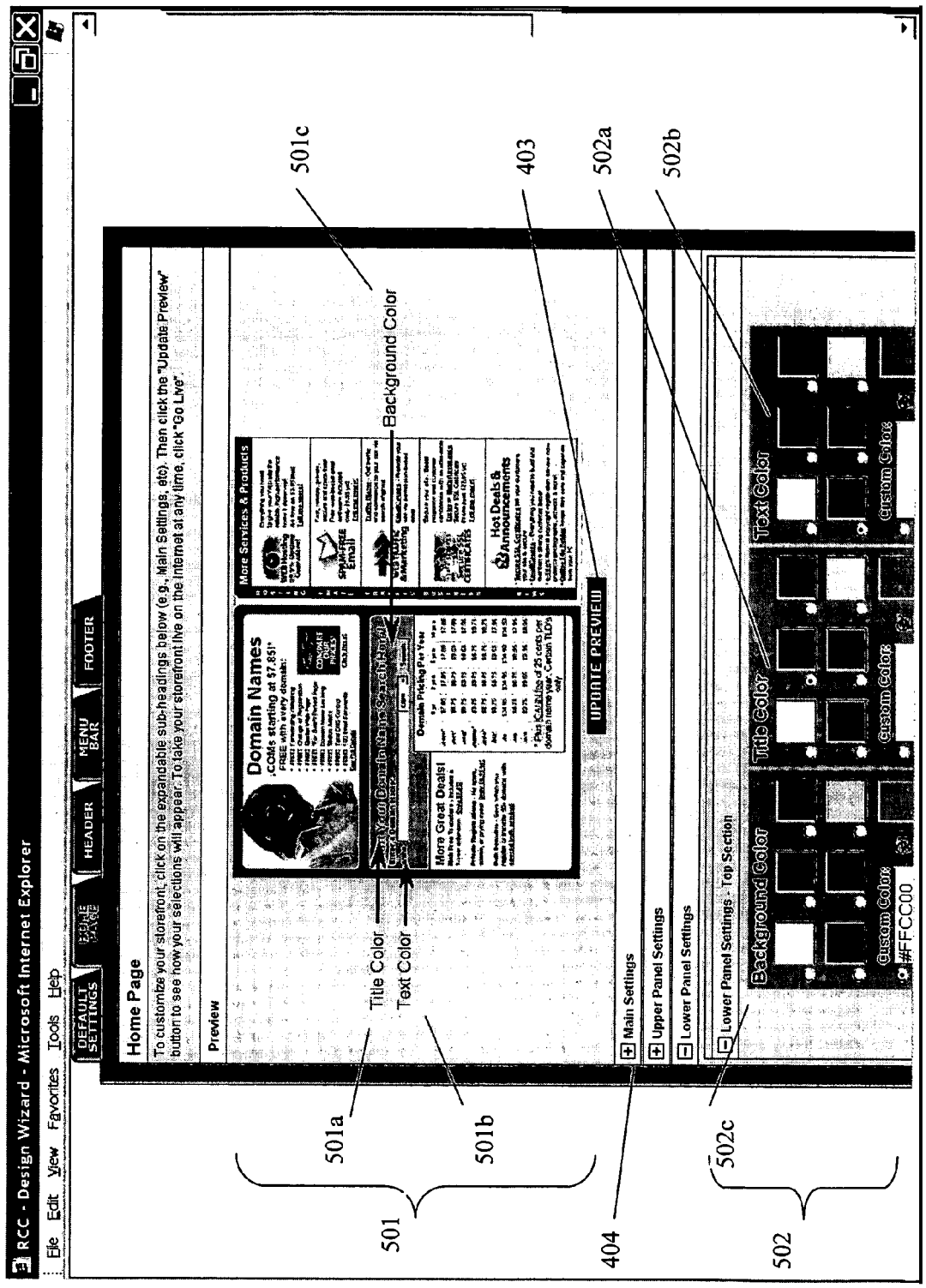
FIG. 5 is an illustration of a host web page showing a scaled view of a target web page, a second overlay and a second editing palette.

As shown in FIGS. 4 & 5, a scaled view of a target web page 107 may be displayed on a host web page 105 to facilitate the editing of the target web page 107. A first editing palette 402, shown on the host web page 105, may be used to assist the Designer 100 in editing the target web page 107. The host web site 104 may be capable of displaying a plurality of different editing palettes on the host web page 105. The editing palettes may be displayed one at a time, as shown in FIGS. 4 & 5, or a plurality may be shown on the host web page 105. The number and capabilities of the different editing palettes control the amount of freedom the Designer 100 has in designing the target web site 106.

FIG. 4 shows an example of an editing palette 402 that allows a primary product 402a, a panel trim color 402b and a border color 402c to be selected. FIG. 5 shows an example of an editing palette 502 that allows a title color 502a, text color 502b, and a background color 502c to be selected. Any number of editing palettes may be created by the Host 102 on the host web page 105 and each editing palette may be used to edit different features or combination of features for the target web page 107. A menu 404 may be used for selecting the different editing palettes, such as a second editing palette 502 to replace the first editing palette 402 that is illustrated on the host web page 105.

One or more overlays 401 may be positioned near or superimposed over the view of the target web page 107 so that the overlay(s) 401 provides information related to the editing palette(s) 402. As new editing palettes 502 are selected, new overlays 501 may appear on the host web page 105. Overlays associated with editing palettes no longer available may be removed so that only information pertinent to the currently available editing palettes is displayed near or superimposed over the view of the target web page 107. New overlays may advantageously provide useful information specifically related to currently available editing palettes. Allowing only one or a very few editing palettes (and their associated overlays) removes clutter from the host web page 105 and simplifies the process. On the other hand, providing multiple active editing palettes (and their associated overlays) greatly enhances the speed and efficiency in editing the target web page 107 for skilled Developers 100.

FIG. 4 shows an example of an overlay 401 that provides useful editing information regarding a primary product 401a, a panel trim color 401b and a border color 401c. FIG. 5 shows an example of an overlay 501 that provides useful editing information regarding a title color 501a, text color 501b, and a background color 501c. Thus, the overlay 401 provides useful editing information related to the editing palette 402 in FIG. 4 and the overlay 501 provides useful editing information related to the editing palette 502 in FIG. 5. The process of selecting new editing palettes with corresponding overlays may be repeated as many times as desired by the Designer 100 in designing and editing the target web page 107. The example overlays in FIGS. 4 and 5 have a transparent background with text and lines in the foreground. This allows the target web page 107 to be seen through the transparent background portion of the overlay 401 while also allowing the text and lines in the foreground of the overlay 401 to be seen on the host web page 105. Overlays of this type are very versatile and easy to implement.

In another embodiment of the invention, a first section of a host web page 105 may be used to illustrate a scaled view of a target web page 107. A second section of the host web page 105 may be used to illustrate a first editing palette 402. A third section of the host web page 105 may be used to illustrate a first overlay 401 positioned near or superimposed over the scaled view of the target web page 107 with the first overlay 401 providing information related to the first editing palette 402. A fourth section of the host web page 105 may be used to illustrate a menu 404 for selecting a second editing palette 502 to replace the first editing palette 402 illustrated on the host web page 105.

Figure 2:
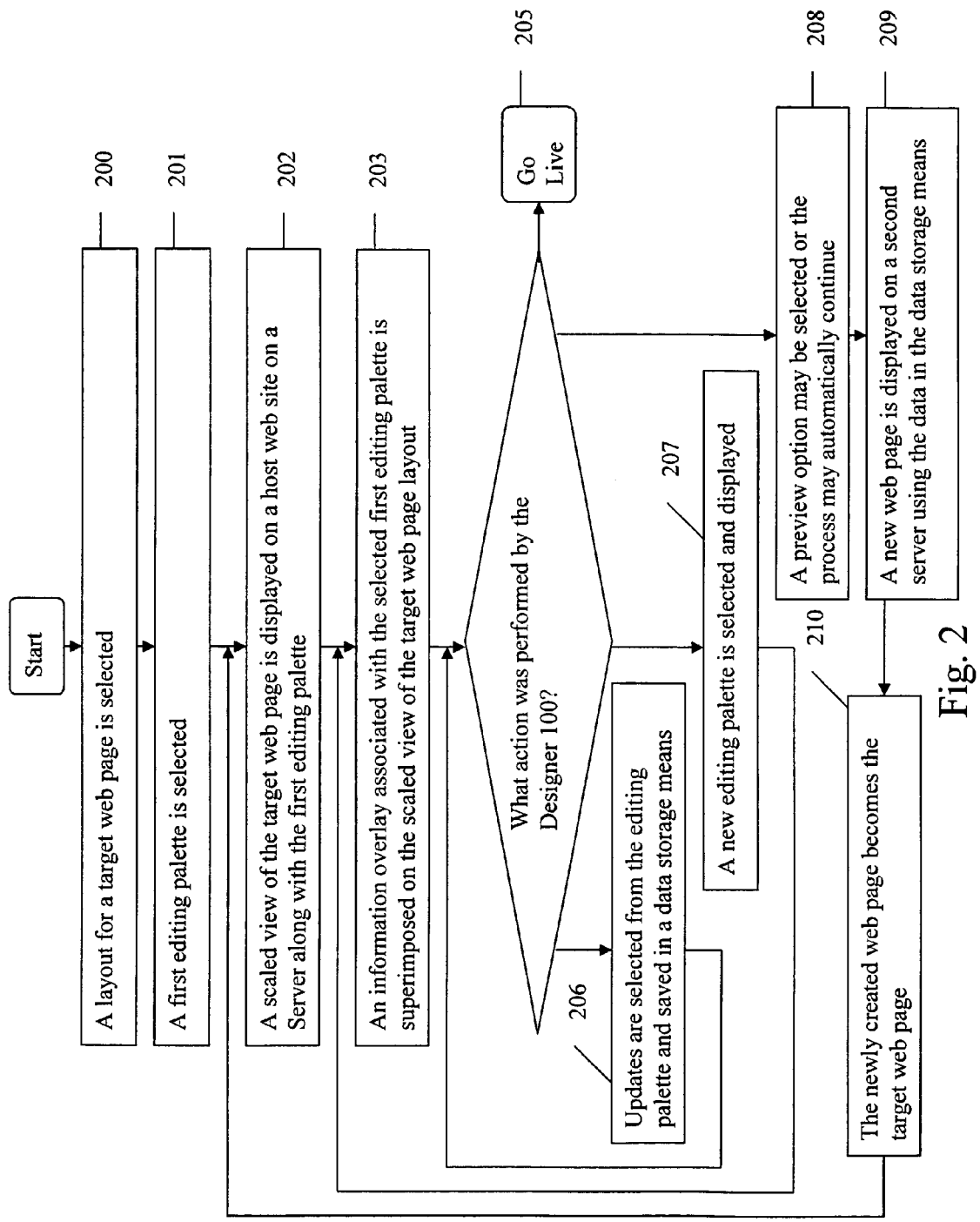
FIG. 2 is a flow chart illustrating a possible embodiment of the invention.
Figure 3:
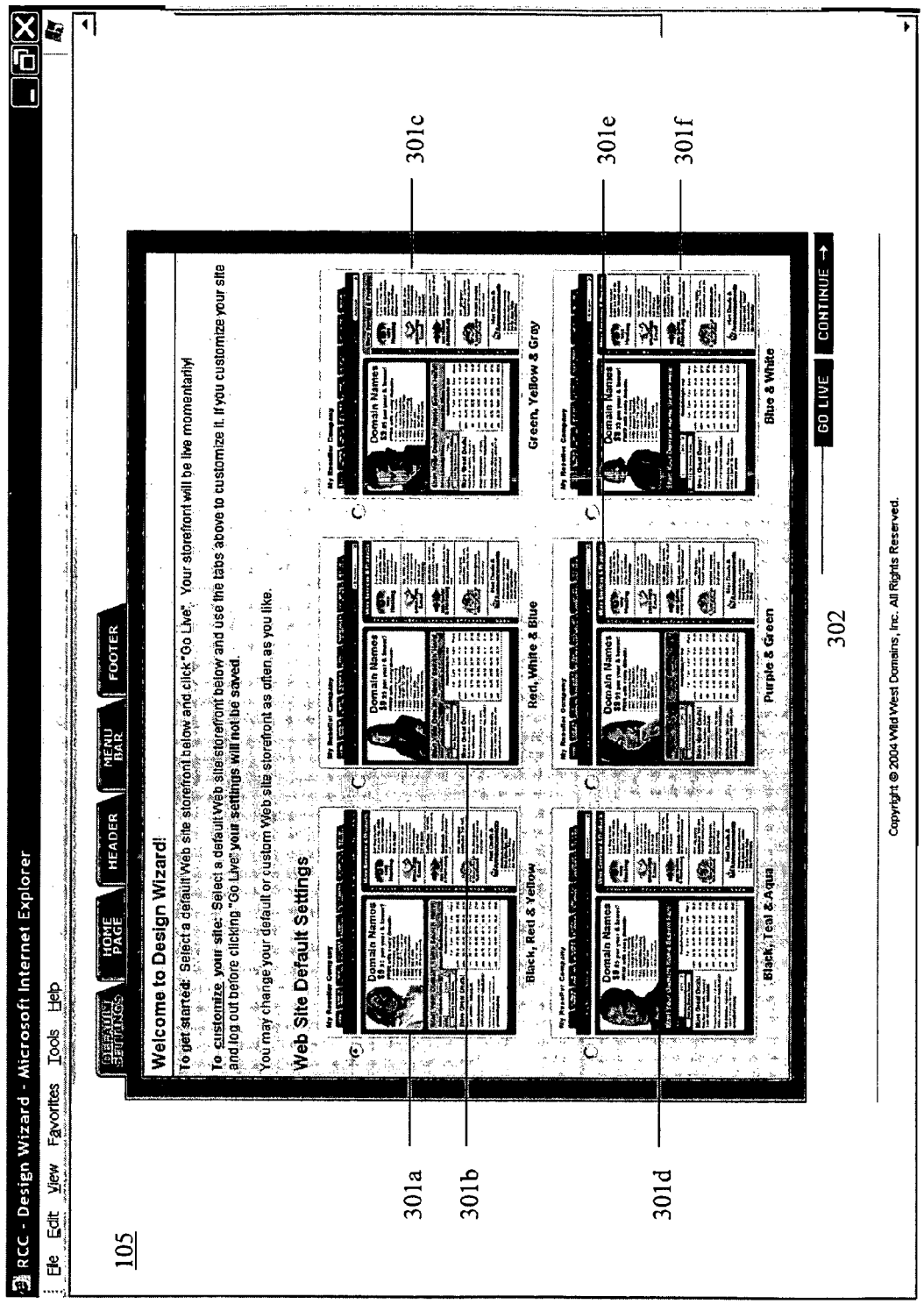

A process for using another embodiment of the invention is shown in FIG. 2. A Designer 100 or a server 103 may select an initial or default target web page 107. (Step 200) FIG. 3 shows an example of a host web page 105 showing six different possible initial or template target web pages 301a-f that a Designer 100 may select to easily and quickly get their target web page 107 started. The server 103 is preferably programmed such that it will display a scaled view of the selected target web page 107 on the host web page 105 as shown in FIGS. 4 & 5.

The Designer 100 or the server 103 may select a first editing palette 402. (Step 201) The server 103 may display the first editing palette 402 on the host web page 105 to allow the Designer to easily edit the target web page 107. (Step 202) The server 103 may position a first overlay 401 proximate to or superimposed over the scaled view of the target web page 107 to assist the Designer 100 in editing the target web page 107. (Step 203) The first overlay 401 is preferably displayed near the scaled view of the target web page 107 so that both may be seen simultaneously. This permits the first overlay 401 to provide information to the Designer 100 that assists the Designer 100 in the use of the first editing palette 402. If a change is selected by the Designer 100 using the first editing palette 402 to the target web page 107, then data representing the change may be saved in a data storage means. (Step 206) Data representing the change may be stored, for example, as ASCII characters or in any other format that allows the server 103 to keep track of the changes made to the target web site 106 by the Designer 100.

The host web site 104 may provide a range of editing capabilities to the Designer 100 for modifying the target web site 106. For example, the host web site 104 may provide the Designer 100 with tools that only permit small customization to be made or the host web site 104 may provide the Designer 100 with tools that permit all or many of the features of the target web site to be changed/edited or anywhere in between.

At some point during the editing process of the target web site 106, the Designer 100 may desire to use a second editing palette 502 to edit different aspects of the target web page 107. The Designer 100 may select a second editing palette 502 via a menu 404 and the first overlay 401 may be replaced by a second overlay 501. The second overlay 501 will preferably contain information relevant to the second editing palette 502. (Step 207) In a preferred embodiment, the second overlay 501 is selected and used to replace the first overlay 401 automatically without interaction by the Designer 100 after the Designer 100 selected the second editing palette 502.

The changes/edits made by the Designer 100 on the scaled view of the target web page 107 may appear in real time or the edits may appear after the Designer 100 performs a particular action, such as pressing an update button 403 (Step 208). Allowing the edits to the target web page 107 to appear in real time on the scaled view of the target web page 107 simplifies the editing process for the Designer 100 as the Designer always sees the latest version on the host web page 105. However, performing continuous updates to the target web page 107 as each change is made requires a more robust, and therefore more expensive, server 103 to be used.

One possible process for displaying a second, i.e. an updated, scaled target web page 107 on the host web page 105 will now be described. The server 103 may be provided data to display a first target web page 107 and may acquire, as the Designer 100 selects particular changes, data representing changes to be made to the first target web page 107 from Step 206. Both sets of data at this point may be suitable for displaying and generating a web page, but may not be as suitable for trimming, scaling/resizing to make a larger or smaller image of the target web page 107. For example, some or all of both sets of data may be in Hypertext Markup language (HTML). HTML is useful for displaying web pages, but it is not as useful for manipulating or scaling an image of a web page. Both sets of data may be used to display or generate a second target web page, possibly on a second server. (Step 209) The second target web page at this point may be purely in an electronic form and does not have to be viewable to the Designer 100 or anybody else. The second target web page merely allows data representing its image to be captured and stored. This image data is preferably captured in a format suitable for trimming and/or scaling as is known in the art. For example, the image data may be in a jpeg, gif, png or other easily manipulated format. The image data may now be easily manipulated to create data to be used to display a scaled view of the second target web page 107 on the host web page 105. (Steps 210 & 202)

A first and a second server may be used to distribute the workload and increase the speed of the updating process of the scaled view of the target web page 107 on the host web page 105. In yet another embodiment a single server (or two virtual servers on a single server) may be used to lower the cost of the infrastructure necessary to practice the invention.

The above described process may be repeated so that a scaled view of the edited target web page 107 is displayed on the host web page 105. The changing/editing process, including the updating of the scaled view of the target web page 107, may be repeated as many times as desired by the Designer 100.

As an alternative to the Designer 100 selecting an update preview 403 option, an automated system may be utilized. The automated system may start after a change/edit is selected from an editing palette 402, 502 to a first target web page 107. Data representing the change may be combined with data representing the first target web page 107 to create graphical data for a second target web page. The graphical data for the second target web page may be manipulated so as to form graphical data to display a scaled view of the second target web page on the host web page 105.

The process of editing the target web page 107 as described may be repeated as many times as desired by the Designer 100. Also, the Designer 100 may edit any or all of the target web pages 107 that form the target web site 106. Once the Designer 100 has finished editing the target web pages 107 in the target web site 106, the Designer 100 may select a "Go Live" option that makes the target web site 106 accessible via the Internet 101. (Step 205) The target web site 106 may be made accessible via the Internet and the Designer 100 is now available for electronic commerce. Alternatively, the target web site 106 may be automatically updated and made accessible via the Internet 100 after each edit, after a certain number of edits, after a certain amount of time, after a particular edit, or after some other condition has been met.

In view of the foregoing, it will be understood by those skilled in the art that the systems and processes of the present invention can facilitate the design and editing of a target web site 106 by a Designer 100 using a host web site 104. The above-described embodiments have been provided by way of example, and the present invention is not limited to these examples. Multiple variations and modification to the disclosed embodiments will be obvious, to the extent not mutually exclusive, to those skilled in the art upon consideration of the foregoing description. Such variations and modifications, however, fall well within the scope of the present invention as set forth in the following claims.

What is claimed is:

1. A method for creating a scaled view of a target web page displayed on a host web page, comprising the steps of:
   a) storing data to display a first target web page;
   b) without displaying any portion of a first scaled view of the first target web page:
      1) generating the first target web page using the data;
      2) capturing data representing an image of the first target web page; and
      3) producing the first scaled view of the first target web page from the data; and
   c) displaying the first scaled view of the first target web page on a host web page; d) displaying a first editing palette on the host web page; and e) displaying a first overlay comprising text associated with the first editing palette proximate to the scaled view of the target web page on the host web page, wherein the first overlay provides useful editing information related to the first editing palette.

2. The method of claim 1, further comprising the step of:
f) a Designer selecting a change for the first target web page;
g) saving data representing the change;
h) without displaying any portion of a second scaled view of the second target web page:
   1) generating the second target web page using the data;
   2) capturing data representing the second target web page; and
   3) producing the second scaled view of the second target web page from the data; and
i) displaying the second scaled view of the second target web page on the host web page.

3. The method of claim 1, further comprising the steps of:
f) a Designer selecting a change for the first target web page;
g) saving data representing the change;
h) the Designer selecting a preview option;
i) without displaying any portion of a second scaled view of a second target web page:
   1) generating the second target web page using the data;
   2) capturing data representing the second target web page; and
   3) producing the second scaled view of the second target web page from the data; and
j) displaying the second scaled view of the second target web page on the host web page.

4. The method of claim 1, further comprising the steps of:
f) a Designer selecting a second editing palette;
g) displaying the second editing palette; and
h) replacing the first overlay with a second overlay, wherein the second overlay contains information relevant to the second editing palette.

5. The method of claim 1, wherein generating the first target web page is performed on a first server and displaying the second scaled view of the first target web page is performed on a second server.

6. The method of claim 1, wherein generating the first target web page and displaying the second scaled view of the first target web page is performed on the same server.

7. A method for creating a scaled view of a target web page displaying on a host web page, comprising the steps of:
a) selecting a layout for a first target web page;
b) selecting a first editing palette;
c) displaying a scaled view of the first target web page and the first editing palette on a host web page;
d) selecting a change from the first editing palette, then saving the change in a data storage means; and
e) selecting a preview option, then:
   1) without displaying any portion of a scaled view of a second target web page:
      A) generating the second target web page using the data;
      B) capturing data representing the second target web page; and
      C) producing the scaled view of the second target web page from the data; and
   2) displaying the scaled view of the second target web page on the host web page; positioning a first overlay comprising text associated with the first editing palette proximate to the scaled view of the second target web page, wherein the first overlay provides useful editing information related to the first editing palette.

8. The method of claim 7, further comprising the steps of:
g) a Designer selecting a second editing palette; and
h) replacing the first overlay with a second overlay, wherein the second overlay contains information relevant to the second editing palette.

9. The method of claim 8, further comprising the step of:
i) the Designer selecting a go live option, wherein the target web page is made accessible to a plurality of Customers via the Internet.

10. A method for creating a scaled view of a target web page displayed on a host web site, comprising the steps of:
a) selecting a layout for a first target web page;
b) selecting a first editing palette;
c) displaying on a first server the first editing palette and a scaled view of the first target web page so that both may be seen simultaneously;
d) displaying a first overlay comprising text associated with the first editing palette superimposed over the scaled view of the first target web page wherein the first overlay provides useful editing information related to the first editing palette; and
e) selecting an edit from the first editing palette to the first target web page, then:
   1) saving data representing the change;
   2) creating on a second server a second target web page using the data representing the change;
   3) capturing data representing the second web page;
   4) manipulating the data representing the second web page so as to contain data to display a scaled view of the second web page; and
   5) displaying on the first server the scaled view of the second web page on the host web site using the manipulated data representing the second web page.

11. The method of claim 10, further comprising the steps of:
g) a Designer selecting a second editing palette; and
h) replacing the first overlay with a second overlay, wherein the second overlay contains information relevant to the second editing palette.

12. A method for creating a scaled view of a target web page displayed on a host web site, comprising the steps of:
a) generating a first data set in a first format of a first target web page;
b) creating data representing the first target web page using the first data set;
c) capturing the data representing the first target web page, wherein the data is captured as a second data set in a second format and the second format is different from the first format;
d) scaling an image of the first target web page by manipulating the second data set in the second format;
e) displaying the scaled image of the first target web page on a host web page; f) selecting a first editing palette; and
g) displaying a first overlay comprising text associated with the first editing palette superimposed over the scaled view of the first target web page, wherein the first overlay provides useful editing information related to the first editing palette.

13. The method of claim 12, wherein data in the second format is in a jpeg, gif or png format.

14. The method of claim 12, wherein steps b), c), and d) are performed on a different server than step e).

* * * * *